United States Patent
Drushku et al.

(10) Patent No.: US 10,915,522 B2
(45) Date of Patent: Feb. 9, 2021

(54) LEARNING USER INTERESTS FOR RECOMMENDATIONS IN BUSINESS INTELLIGENCE INTERACTIONS

(71) Applicant: BUSINESS OBJECTS SOFTWARE LTD., Dublin (IE)

(72) Inventors: Krista Drushku, Paris (FR); Nicolas Labroche, Tours (FR); Patrick Marcel, Tours en Sologne (FR); Verónika Peralta, Blois (FR)

(73) Assignee: Business Objects Software Ltd., Dublin (IE)

( * ) Notice: Subject to any disclaimer, the term of this patent is extended or adjusted under 35 U.S.C. 154(b) by 361 days.

(21) Appl. No.: 15/964,814

(22) Filed: Apr. 27, 2018

(65) Prior Publication Data

US 2019/0163782 A1   May 30, 2019

Related U.S. Application Data

(60) Provisional application No. 62/592,152, filed on Nov. 29, 2017.

(51) Int. Cl.
| | |
|---|---|
| *G06F 16/242* | (2019.01) |
| *G06F 16/335* | (2019.01) |
| *H04L 29/08* | (2006.01) |
| *G06Q 10/06* | (2012.01) |

(52) U.S. Cl.
CPC ........ *G06F 16/2425* (2019.01); *G06F 16/337* (2019.01); *G06Q 10/06316* (2013.01); *H04L 67/22* (2013.01); *H04L 67/26* (2013.01); *H04L 67/306* (2013.01)

(58) Field of Classification Search
CPC .............. G06F 16/2425; G06F 16/337; G06Q 10/06316
See application file for complete search history.

(56) References Cited

U.S. PATENT DOCUMENTS

| | | | | |
|---|---|---|---|---|
| 7,979,426 | B2* | 7/2011 | Jeong | G06F 16/337 707/723 |
| 8,065,257 | B2* | 11/2011 | Kuecuekyan | G06N 20/00 706/46 |
| 2012/0066195 | A1* | 3/2012 | Lee | G06F 16/3322 707/706 |
| 2014/0344103 | A1* | 11/2014 | Zhu | G06Q 30/0623 705/26.7 |

\* cited by examiner

*Primary Examiner* — Kris E Mackes
(74) *Attorney, Agent, or Firm* — Fish & Richardson P.C.

(57) ABSTRACT

Methods, systems, and apparatus, including computer programs encoded on a computer storage medium, for improving recommendation to users in data intelligence systems. In one aspect, a method includes the actions of receiving a current observation describing an interaction of a user with a data intelligence system; identifying a current user interest based on the current observation, wherein past observations of the user with the data intelligence system are clustered to form user interests in a Markov model; using the Markov model and based on the current user interest, determining a next user interest from the user interests; extracting a one past observation from the determined next user interest based on a selection criterion and a threshold, wherein the selection criterion is based on how closely the at least one past observation matches the current observation; and sending a recommendation to the user based on the past observation.

16 Claims, 8 Drawing Sheets

LEARNING USER INTERESTS FOR RECOMMENDATIONS IN BUSINESS INTELLIGENCE INTERACTIONS

TECHNICAL FIELD

This disclosure relates to methods, systems, and apparatus for improving recommendation to users in data intelligence systems.

BACKGROUND

Business Intelligence (BI) systems provides access to data intelligence through historical, current, and predictive views of business operations. BI systems may work with operation data and/or data that has been gathered into a data warehouse or a data mart. System elements support, for example, reporting, interactive analyses, visualization, and statistical data mining. Applications within BI systems service may include, for example, sales, production, financial, and other sources of business data for purposes that include business performance management. BI system users range from executives to data enthusiasts. These users may navigate large datasets within such systems through sequences of analytical queries, which may be elaborated through user-friendly interfaces.

SUMMARY

The present disclosure describes methods and systems, including computer-implemented methods, computer-program products, and computer systems for a recommendation system that identifies coherent interests of users with various expertise querying data sources.

In a general implementation, systems, apparatus, and methods for receiving a current observation describing an interaction of a user with a data intelligence system; identifying a current user interest from a plurality of user interests based on the current observation, wherein past observations of the user with the data intelligence system are clustered to form the user interests in a Markov model; using the Markov model and based on the current user interest, determining a next user interest from the user interests; extracting at least one past observation from the determined next user interest based on a selection criterion and a threshold, wherein the selection criterion is based on how closely the at least one past observation matches the current observation; and sending a recommendation to the user based on the at least one past observation.

In another general implementation, one or more non-transitory computer-readable storage media coupled to one or more processors and having instructions stored thereon which, when executed by the one or more processors, cause the one or more processors to perform operations that include: receiving a current observation describing an interaction of a user with a data intelligence system; identifying a current user interest from a plurality of user interests based on the current observation, wherein past observations of the user with the data intelligence system are clustered to form the user interests in a Markov model; using the Markov model and based on the current user interest, determining a next user interest from the user interests; extracting at least one past observation from the determined next user interest based on a selection criterion and a threshold, wherein the selection criterion is based on how closely the at least one past observation matches the current observation; and sending a recommendation to the user based on the at least one past observation.

In yet another general implementation, a system includes one or more processors; and a computer-readable storage device coupled to the one or more processors and having instructions stored thereon which, when executed by the one or more processors, cause the one or more processors to perform operations comprising: receiving a log file that includes log records generated from a code base; processing the log file through a pattern-mining algorithm to determine a usage pattern; generating a graphical representation based on an analysis of the usage pattern; processing the graphical representation through a machine-learning algorithm to select a set of test cases from a plurality of test cases for the code base and to assign a priority value to each of the selected test cases; sequencing the set of test cases based on the priority values; and transmitting the sequenced set of test cases to a test execution engine.

An aspect combinable with the general implementations, the Markov model includes transition probabilities between the user interests, and wherein the next user interest is determined according the transition probabilities between the user interests.

In an aspect combinable with any of the previous aspects, the recommendation includes a sequence of queries for the data intelligence system determined according to the at least one past observation.

In an aspect combinable with any of the previous aspects, the sequence of queries includes Online Analytical Processing (OLAP) explorations or Structured Query Language (SQL) sessions.

In an aspect combinable with any of the previous aspects, the recommendation includes a set of queries for the data intelligence system determined according to the at least one past observation.

In an aspect combinable with any of the previous aspects, the identification of the current user interest includes computing an average similarity between the current observation and all the past observations in each of the user interests of the Markov model.

In an aspect combinable with any of the previous aspects, the interaction of the user with a data intelligence system is a user query or a user click.

In an aspect combinable with any of the previous aspects, the past observations are clustered into the user interests based on a supervised classification using a feature-based metric.

In an aspect combinable with any of the previous aspects, the supervised classification assigns a weight to each of a plurality of features describing each of the past observations.

In an aspect combinable with any of the previous aspects, the recommendation includes possible next moves in a data exploration on the data intelligence system determined according to the at least one past observation.

Implementations include systems and processes to provide recommendations for users of different expertise. Particular implementations of the subject matter described in this disclosure can be implemented so as to realize one or more of the following advantages. The recommendations are tailored to meet a particular user's interest to, for example, increase productivity by focusing the user's interaction(s) with a data intelligence system. The described system discovers and categorizes user interest to provide more pertinent recommendation related to a current context and the users competences. Working with, for example, BI objects, more than just exploring past logs and user groups, permits profiting from other BI properties and functional relationships that enrich models to better identify the user interests. Implementations of the described system provide ways to use user interests to predict future interactions and this way the system outperforms existing recommending systems.

The details of one or more implementations of the subject matter of this specification are set forth in the accompanying drawings and the later description. Other features, aspects, and advantages of the subject matter will become apparent from the description, the drawings, and the claims.

DETAILED DESCRIPTION

Figure 1:
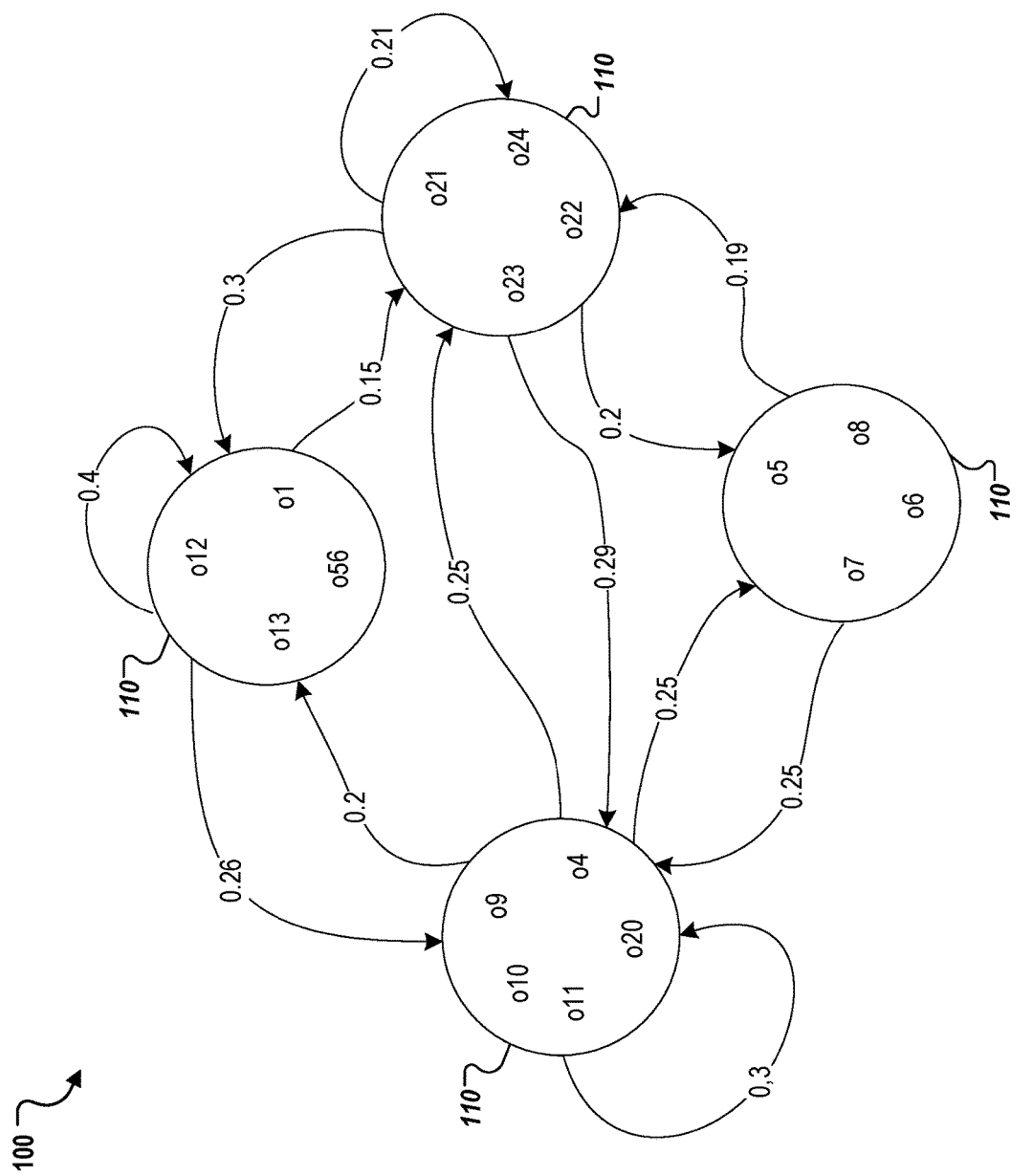
FIG. 1 depicts an example Markov model employed by the described recommendation system.

This disclosure generally describes a methodology for a recommendation system based on identified user-interests through a model built from past user interactions. The disclosure is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Recommending queries suitable for data intelligence (e.g., BI) interactions has attracted many attentions recently, either in the context of OLAP explorations or SQL sessions. Existing recommendation systems are primarily based on personal user past logs, user and item categories, or user relations. These recommendation systems may perform naïve or collaborative and hybrid recommenders to find the related items to users, for example, looking to their past interactions or the classes they are categorized into. Accordingly, devising recommendations for users tailored on their interests can increase productivity by focusing the user interactions. To achieve this, an unsupervised learning approach to cluster OLAP queries based on their syntax can be employed to construct Markov models. A Markov model is a stochastic model used to model changing systems. Such models include states that represent the clusters where transitions between such clusters represent the moving from one query to another, less similar one. Additionally, the model is constructed to ensure that clusters correspond to coherent interests through the supervised learning of the metric used for the clustering.

In view of the forgoing, the described recommendation system identifies coherent interests of users with various expertise querying data sources through, for example, keyword-based analytical queries. The recommendation system employs a collaborative recommender for data intelligence interactions and is designed to take advantage of identified user interests. Such user interests are discovered by characterizing the intent of the interaction with the data intelligence system. For example, in a BI system, a set of discriminative features for characterizing BI interactions may be identified through observations of user interaction(s) for a description of intents and for grouping intents into coherent interests. An observation is composed of the question written by the user, the formalized queries proposed by the system mapping this question to business objects and finally, the result returned by the query the user has chosen. Once user interests are identified, they may be employed in a collaborative BI query recommendation system that suggests, for example, next moves in a data exploration based on the probability for a user to switch from one interest to another. Such a collaborative recommendation system may be built based on a Markov model that represents the probability for a user to switch from one interest to another. The described system outperforms a query similarity measure and yields a high precision with respect to expressed user interests. To group observations into coherent user interests, the described system may first employ supervised classification that define a similarity measure. For example, such a similarity measure may assign a weight to each of the discriminative features, and can be employed to group observations through a clustering algorithm.

The system may also include an Interest based recommender (IbR) model that is a user interest-based collaborative recommender designed to take advantage of the identified clusters to recommend queries or a sequence of queries to complement an existing user interaction. In some implementations, the IbR model pre-fetches or predict OLAP queries and uses an order-1 Markov model to probabilistically represent user behaviors. The states of the Markov model may be clusters constructed from a set of past interactions built through observations of the users. The IbR model can be employed in the described system to guide users to a next move(s) based on the probabilities of, for example, discovered user intents. Moreover, the IbR model can be used to recommend a sequence of queries representing a sequence of moves that is predicted to complete the beginning of an interaction.

In some implementations, operations included clustering the observations to detect user interests. In some instances, the clustering can be performed offline. The clusters can be treated as states of a Markov chain model and employed in computing the probabilities of a most likely next state. For example, when a new interaction begins, each observation of the interaction can be used to compute the most probable query in the sense of the respective Markov model.

In some implementations, a Markov model is created where U represents the set of clusters expressing user interests, and where the states of the Markov model are the clusters of U. In such implementations, the transition probability distribution is given by:

$$Pr(X_{n+1} = x \mid X_n = y) = \frac{n_{xy}}{n_y} \quad \text{1)}$$

where x and y are clusters in U, $n_y$ is the size (the number of observations) of cluster y, and $n_{xy}$ is the number of interactions that contain two adjacent observations $o_i$; $o_i+1$ such that $o_i$ is in cluster y and $o_i+1$ is in cluster x. A special state is used to represent the end of interactions.

In some implementations, given a current observation the described recommendation system identifies a user interest (e.g., a cluster) to which the observation is closest by computing the average similarity between the current observation and all the observations of each cluster. Once a cluster has been identified, the Markov model returns or identified the most probable next state. In this most probable next state, the observations that are determined to be the most similar to the current observation can then be retrieved and presented to the user.

Two modes of IbR, IbR1 and IbR2, are described below; however, other modes of operations may be implemented. Each mode reflects the ways in which recommendations are built and presented to the user. In the IbR1 mode, the chosen queries of these observations are organized in a set of items that is returned as a recommendation. The set may be ordered by, for example, similarity. In the IbR2 mode, the first query of the sequence is the chosen query of the observation that is the most similar to the current observation. This observation is used as the new current observation for which an interest is to be identified. The most similar observation of the next probable state, that has not been already recommended, is identified. To complete the sequence of queries, the system iterates until no further query can be added to the sequence. The queries recommended by IbR1 are taken from a unique cluster (one jump in the Markov model), while IbR2 performs several jumps in the Markov model, taking one query at each jump. With either mode of recommendation, the identified user interests are used to recommend a sequence of observations to users to continue their explorations.

FIG. 1 depicts an example Markov model 100 employed by the described recommendation system. The Markov model 100 includes clusters 110 of past observations for a user. The observations, o9, o10, and so forth, may represent, for example, the user's interest. These clusters or user interests 110 are states of the example Markov model 100. The numbers on each arrow between the clusters 110 represent a likelihood that the user will move to the respective destination cluster 110 from the source cluster (e.g., the transition probabilities between the user interests). Restated, the described recommendation system calculates the odds that a user will move from one interest (cluster) to another interest (cluster) based on a user's past sessions and interactions. These calculated odds are then used to build a Markov model for that user, such as example Markov Model 100, where past observations are clustered and the odds of moving from one cluster 110 to another are represented by arrows or traces between the clusters.

The example Markov model 100 can be used in the described recommendation system to identify a user interest based on, for example, a latest observation(s) of the user. For example, feature-based similarity can be used to calculate an average similarity between a current observation(s) and each cluster 110 of the example Markov model 100. Another way of context identification can be realized by comparing the current observation(s) with the representative observations of each cluster, to avoid the exhaustive calculations. Based the similarities between the current observation and each observation of the next cluster 110 that is identified, the Markov model 100 is used to predict a next item of interest for the user, chosen by this cluster.

Figure 2A:
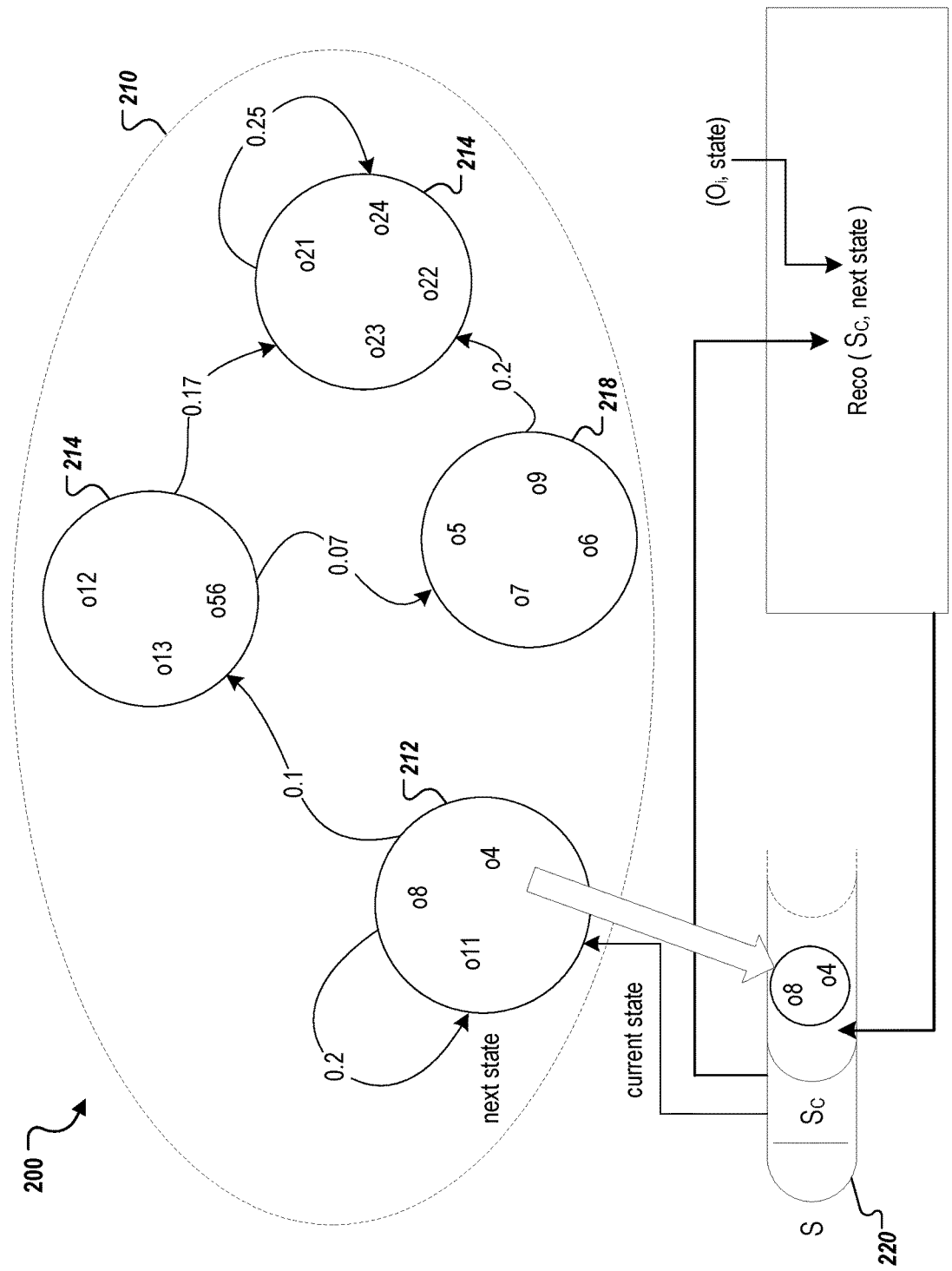
FIG. 2A depicts an example recommendation system for the IbR1 mode, that proposes a set of items

FIG. 2A depicts an example recommendation system 200 for the IbR1 mode. The depicted example system 200 employs a Markov model 210 to recommend a set of recommendations based on a current observation, Oc. Example observations include a question or query written by a user, a webpage being view by a user, a choice in the form of a click, an item/category selection, and so forth. In some implementations, the current observations is compared to the past or recorded observations that are clustered into user interests or states (212-218) of the Markov model 210. The user interest (212-218) that most closely matches the current observation is selected as the current user interest for the current observation. In some implementations, to determine the current user interest, a similarity between current observations with all of the other past observations (e.g., o1, o2, o8) of each user interest (212-218) is calculated as an average sum. For example, a feature-based similarity measure can be used to calculate the average similarities of each user interest to the current observations. Using the Markov model 210, the example system 200 selects a subset of observations, based on a similarity to the current observation and a threshold value, from the current user interests to return as recommendations 220 to the user.

Figure 2B:
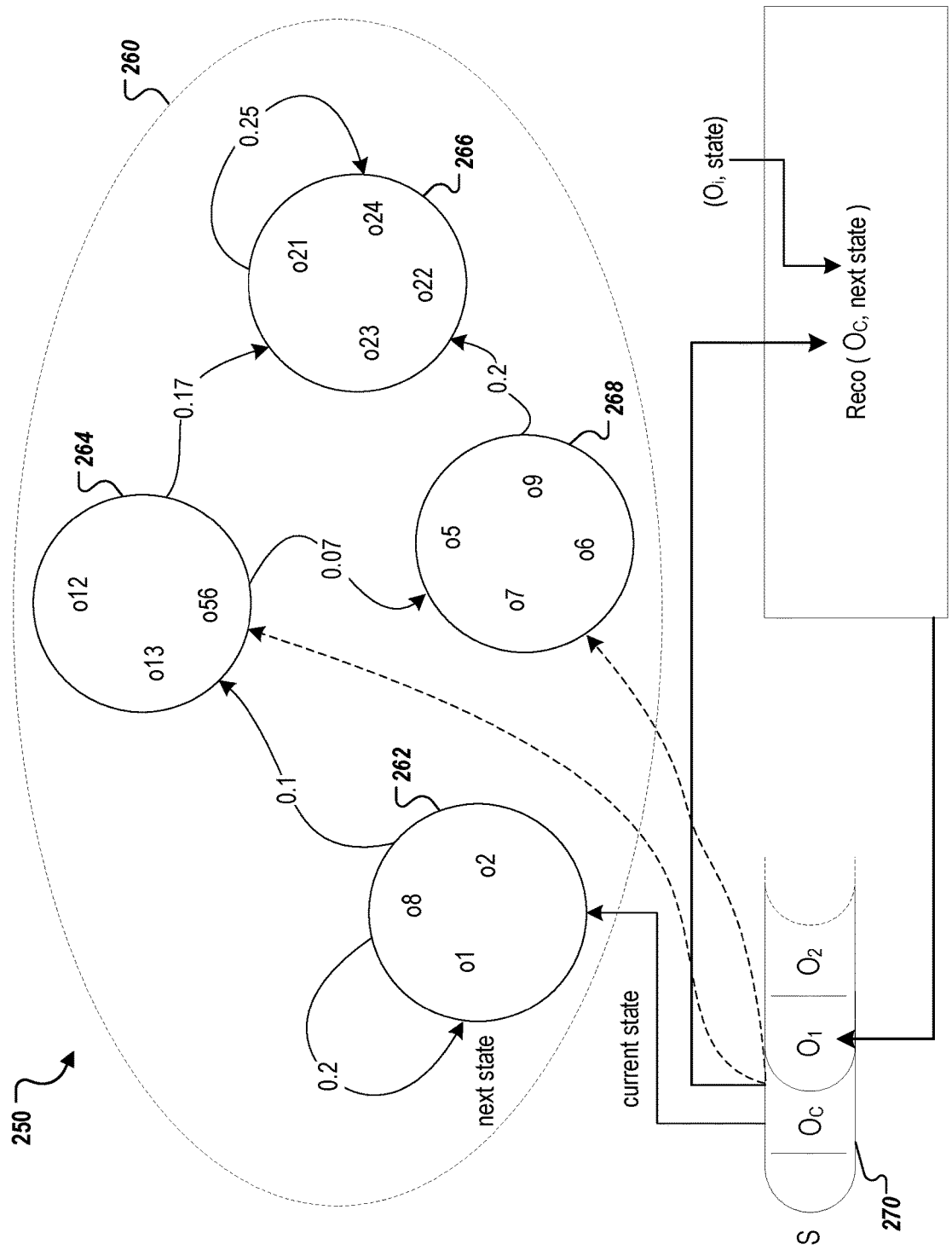
FIG. 2B depicts an example recommendation system for the IbR2 mode, that proposes a sequence of items.

FIG. 2B depicts an example recommendation system 250 for the IbR2 mode. The depicted example system 250 employs a Markov model 260 to recommend a sequence of recommendations 270 based on a current observation, Oc. The recommendation system 250 is substantially similar to the example system 200 and compares the current observations, Oc, with the recorded observations in each cluster (262-268) of the Markov model 260. The example recommendation system 250 differs from the recommendation system 200 in that the return recommendations are not a set, but rather a sequence of recommendations 270.

For example, the user interest (262-268) that most closely matches the current observation is selected as the current user interest for the current observation. Once the current user interest is identified, a next user interest is determined according to the transition probabilities between the user interests according to the Markov Model 260. The sequence of recommendations 270 is built from the observation(s) (e.g., o1, o2, o8) in the next user interest that are closest observation to the current observation based on a selection criterion and a threshold.

In the depicted example, cluster 262 is selected as the current user interest based on the current observation. From this current user interest, cluster 262, the example system 250 employs the Markov model 210 to iteratively search for a next state (depicted by the dashed lines) according to the transition probabilities between the user interests (262-268). In the depicted example, cluster 212 is also selected as the next user interest (based on the transition probabilities between the user interests in the Markov Model 260). Once the next user interest is selected (user interest 262), the system 200 determines the observation(s) in the next user interest that most closely match the current user interest (e.g., $O_1$) and adds it the sequence of recommendations. The system 250 then iteratively determines next user interests (e.g., next states) and subsequent observations from them based on the previously selected observations (e.g., $O_2$ is selected based on $O_1$). The example system 250 continues to employ the Markov model 260 to iteratively search for next states until, for example, a threshold value is met or the sequence includes a configurable number of recommendations. The sequence of recommendations 270, represented by S, is returned to the user. In the depicted example, $O_1$ is the first recommendation in the sequence S followed by $O_2$.

Figure 3:
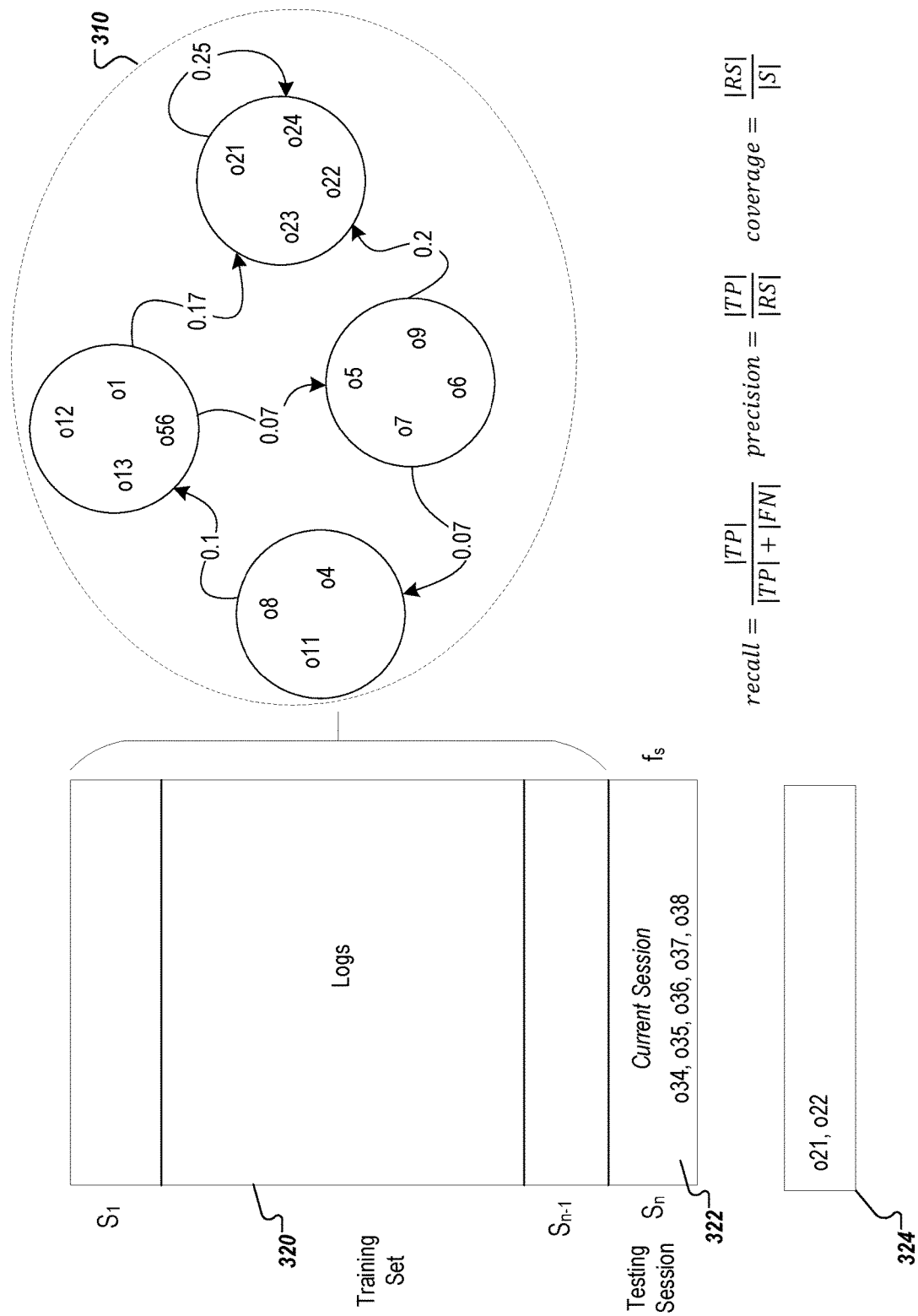
FIG. 3 depicts a descriptive schema of recommendation system evaluation, measuring the precision, recall, and coverage.

FIG. 3 depicts an example evaluation method of a recommendation system 300. An extraction of logs 320 are employed by the system 300 as a training set to build the Markov model 310, while the remainder of the logs are used to test the recommendations for the current session. Recommended observations (o21, o22) are a result of either a set (IbR1) or a sequence (IbR2) on the Markov model 310. Factual session 322 includes several observations (o34, o35, o36, o37, o38). In some implementations, a portion of these observations is used to learn the current interest and the rest used to evaluate the recommendation system 300 through the comparison with the recommended session 324. For example, supposing that three first observations of the factual session are treated as the current session (o34, o35, o36), the remainder of the observations (o37, o38) are compared respectively with o21 and o22 of the recommended session 324 to evaluate the correctness what was predicted/recommended and what the user actually did. Similarities between the observations based on, for example, a threshold value(s), are calculated to determine how closely what was recommended was to what the user actually did. The comparison between the sessions and the composing observation is done through, for example, a similarity measure presented in Falseto recommending system, in order to stay uniform with the state of the art. The comparison between the recommended and factual observations permits calculating the classical quality indices: the recall, the fraction of relevant items recommended; precision, the closeness of the recommended item to the expected one and coverage, the fraction of cases that we could successfully recommend.

FIGS. 4A-4B and 5A-5B depict results of experiments using the two described modes, IbR1 and IbR2, of the recommendation system and compares them with two other existing query recommendation systems: QueRIE and Falesto. As described above, the recommendation system employs a Markov model constructed, for example, from the interactions from which observations have been clustered to identify user interests. For the experiments, the set of interactions with only one observation were removed. For the Markov model constructed, the transition probabilities between clusters were reported, and checked for consistent user interests and the highest probabilities for transitions leading from one cluster to itself. For each recommendation system tested, the accuracy (e.g., the degree to which recommendations correspond to what is expected) and coverage (e.g., the degree to which recommendations can indeed be generated) were assessed to judge both the balance between the ability to recommend and the quality of the recommendations for each recommendation system tested. Additionally, the interactions to sessions were assimilated and the similarity between queries used to compare the chosen queries of interactions to recommended queries.

For the QueRIE based system, the fragment-based, non-binary version of QueRIE was used. Recommended queries were selected from the closest session to the current one, based on their respective signatures, and the set of recommended queries were ranked using the similarity to a current session and arranged in a sequence as done for IbR1. For the Falseto based system, in terms of user interest, it was configured to be more comparable to IbR2 to explore globally, but recommends only already existing queries from the history. Additionally, testing with the Falseto and QueRIE, which are agnostic of user interests, were provided the user interest beforehand by restricting input to one particular user interest. The tests were repeated for each discovered user interest. The accuracy and coverage were reported in each restricted log and compared to the results in the entire log.

Figure 4A:
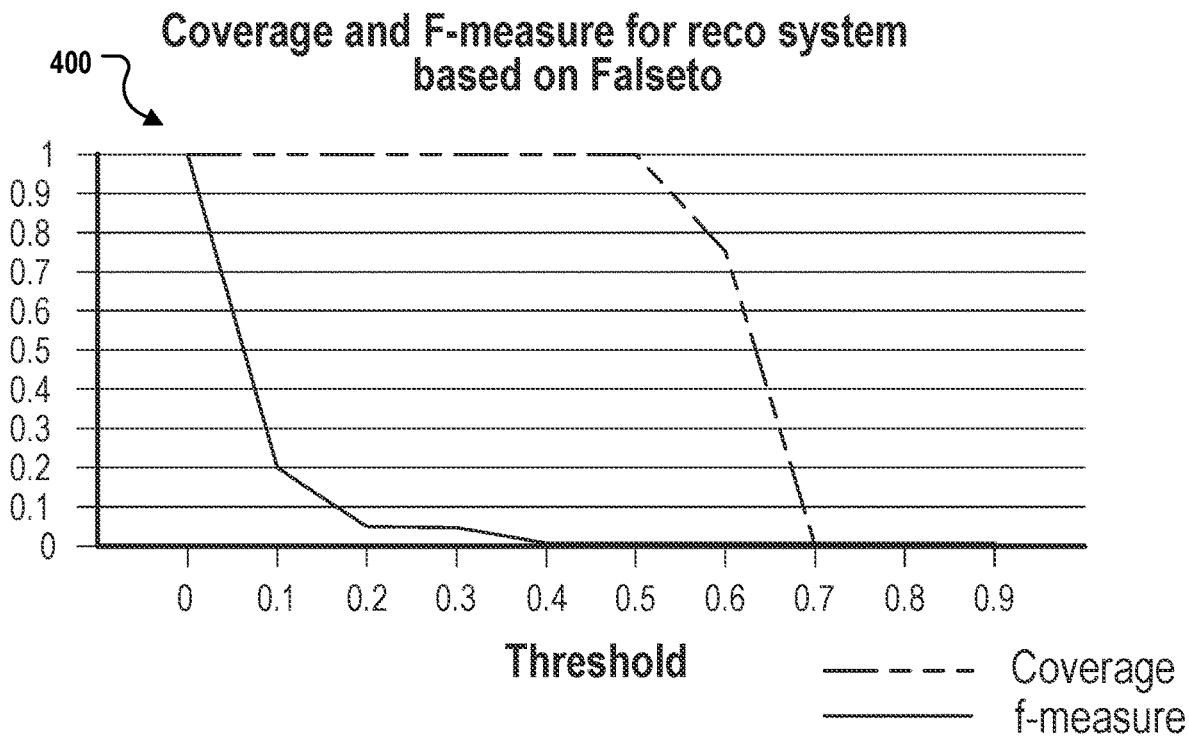
FIGS. 4A-4B depict a comparison of the results between the recommendation system IbR2 and Falesto query recommendation system.
Figure 4B:
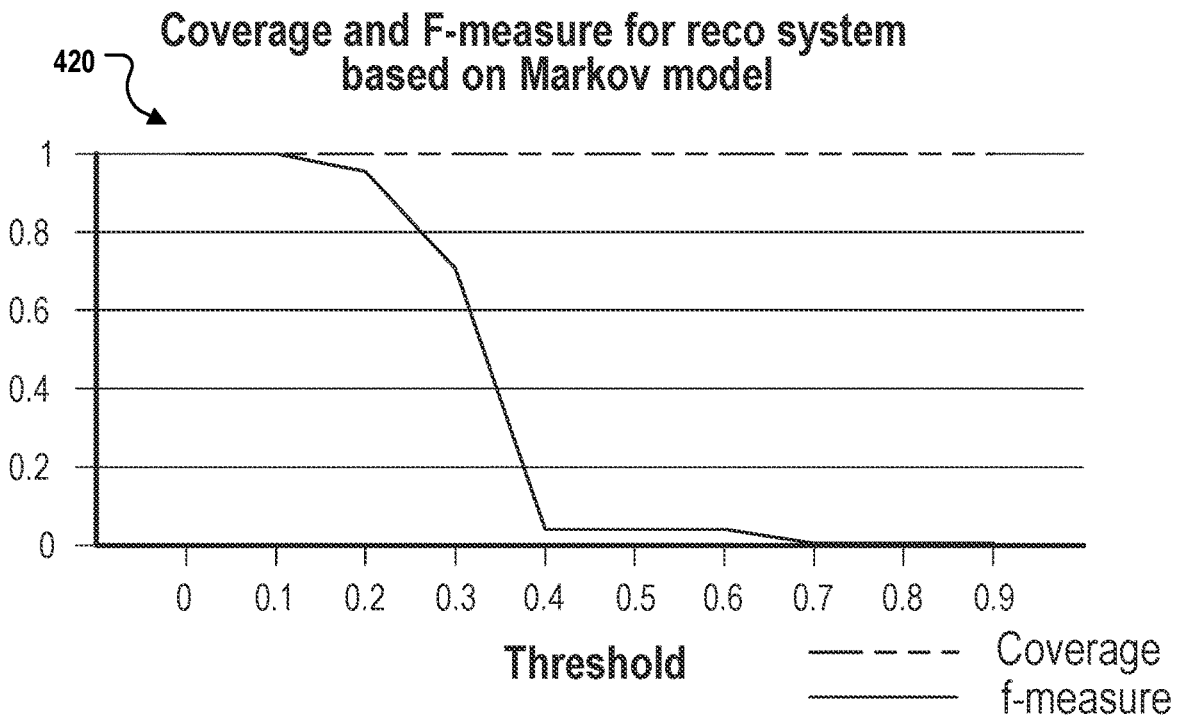

FIGS. 4A-B depict graphs 400 and 420 respectively, which included test results from the datasets as described using the described recommendation system compared with the Falseto system. The coverage, which is the degree to which recommendations can indeed be generated, and the f-measure or accuracy, which is the degree to which recommendations correspond to what is expected. Graph 400 depicts the results of the Falseto system, while graph 420 depicts the results of the described recommendation system IbR2. The threshold is the tolerance used for scoring the matching between what was recommended by each system and the actual values (e.g., how well each system's recommendation matched what the users actually did with the system).

Figure 5A:
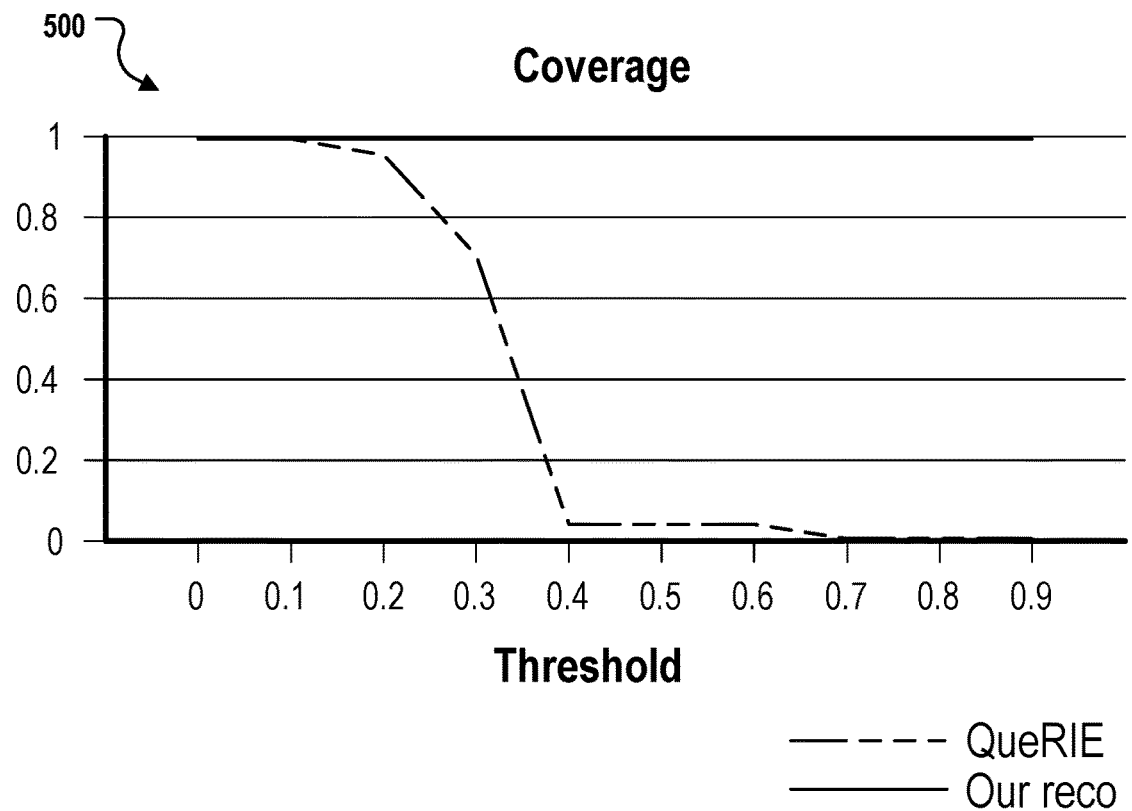
FIGS. 5A-5B depict a comparison of the results between the recommendation system IbR1 and QueRIE query recommendation system.
Figure 5B:
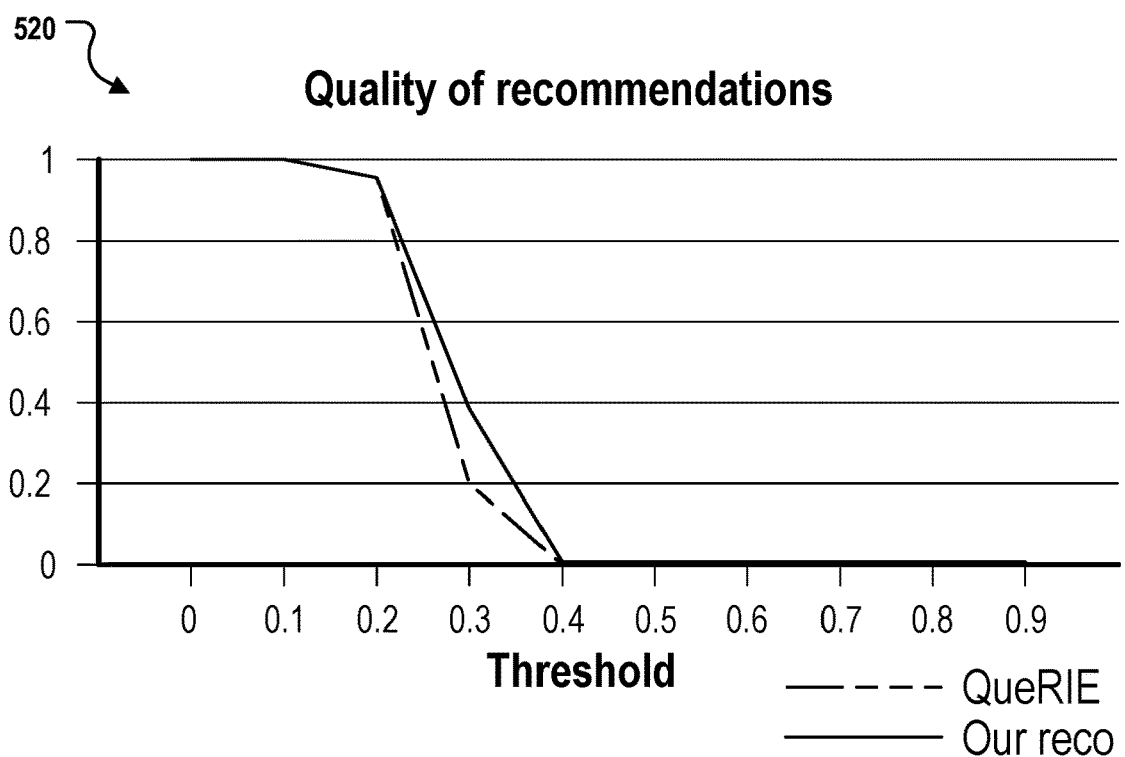

FIGS. 5A-5B depict graphs 500 and 520 respectively, which included test results from the datasets as described using the described recommendation system in IbR1 mode compared with the QueRIE system. Graph 500 depicts the coverage measured against a threshold value from both the described recommendation system and the QueRIE system. Graph 520 depicts the quality of recommendations from both the described recommendation system and the QueRIE system. In the depicted results, IbR1 and QueRIE, both achieve a perfect coverage always producing a recommendation for test data set, and have the same results in terms of accuracy. As depicted, the difference in the similarities used to rank potential recommended queries in QueRIE and IbR1 (fragment-based versus feature-based) has no influence, since potential queries to recommend are issued from the same user interest.

The results of the batch experiments depicted in FIGS. 4A-4B and 5A-5B show that considering a recommendation strategy favoring local exploration achieves weak results in terms of accuracy. Considering global strategy, as in IbR2, shows the effectiveness of relying on well-identified user interests. Moreover, achieving perfect coverage might not be a desirable behavior in case of bad F-measure. However, when looking for unexpected recommendations, it might be preferable to find these recommendations within a user interest.

Figure 6:
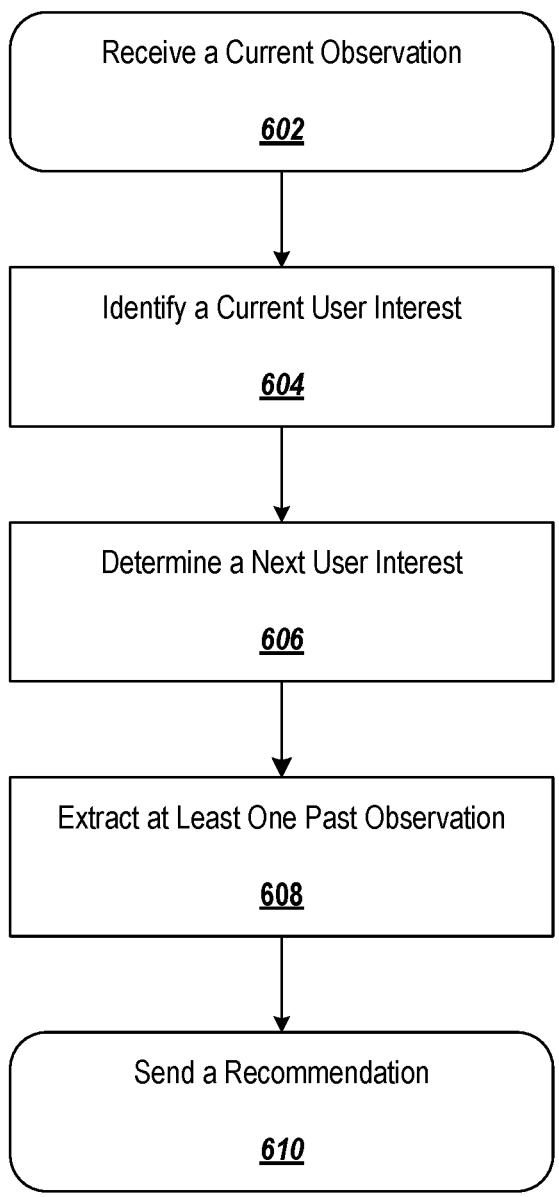
FIG. 6 depicts a flow diagram of an example interest-based recommender process employed to send recommended actions to user of a data intelligence system.

FIG. 6B depicts a flow diagram of an example interest-based recommender process 600 employed to send recommended actions to user of a data intelligence system. For clarity of presentation, the description that follows generally describes method 600 in the context of FIGS. 1-5B and 7. However, it will be understood that method 600 may be performed, for example, by any other suitable system, environment, software, and hardware, or a combination of systems, environments, software, and hardware as appropriate. In some implementations, various operations of method 600 can be run in parallel, in combination, in loops, or in any order.

At 602, current observation describing or associated with a user interacting with a data intelligence system is received. For example, a user may be selecting a query or a view to run or execute within a data intelligence system. From 602, the process 600 proceeds to 604. At 604, a current user interest within a Markov Model is identified based on the current observation. The Markov Model includes past observations of the user with the data intelligence system that are clustered to form user interests or states and transition probabilities between the user interests. In some implementations, these past observations are clustered based on a supervised classification using a feature-based metric where a weight is assigned to each feature, together describing, the past observations. In some implementations, the identification of the current user interest includes computing an average similarity between the current observation and all the past observations in each of user interests of the Markov model. From 604, the process 600 proceeds to 606. At 606, a next user interest is identified using the Markov model and based on the current user interest and the transition probabilities between the user interests. From 606, the process 600 proceeds to 608. At 608, at least one past observation is extracted from the determined next user interest based on a selection criterion and a threshold. The selection criterion may be based on, for example, how closely the at least one past observation matches the current observation and/or computing an average similarity between the current observation and all the past observations in each of user interests of the Markov model. From 608, the process 600 proceeds to 610. At 610, a recommendation is set to the user. The recommendation is determined based on the determined next user interest. In some implementations, the recommendation possible next moves in a data exploration on the data intelligence system determined according to the at least one past observation. In other implementations, the recommendation includes a sequence of queries for the data intelligence system determined according to the at least one past observation. For example, the sequence of queries may include OLAP explorations or SQL sessions. In other implementations, the recommendation includes a set of queries for the data intelligence system. From 610, the process 600 ends.

Figure 7:
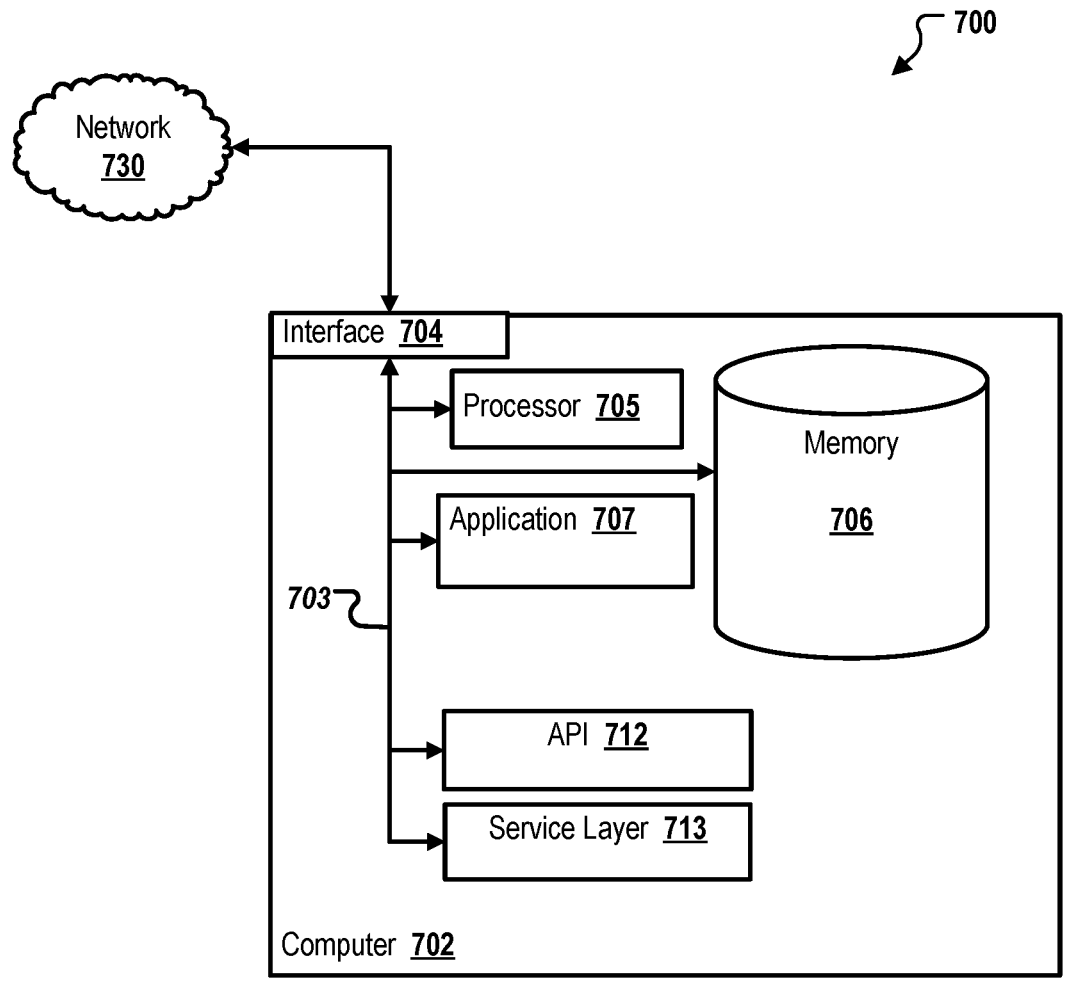
FIG. 7 depicts a block diagram of an exemplary computer system used to provide computational functionalities associated with described algorithms, methods, functions, processes, flows, and procedures as described in the instant disclosure, according to an implementation.

FIG. 7 depicts a block diagram of an exemplary computer system 700 used to provide computational functionalities associated with described algorithms, methods, functions, processes, flows, and procedures as described in the instant disclosure, according to an implementation. The illustrated computer 702 is intended to encompass any computing device such as a server, desktop computer, laptop or notebook computer, wireless data port, smart phone, personal data assistant (PDA), tablet computing device, one or more processors within these devices, or any other suitable processing device, including both physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a GUI.

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence (BI) server, or other server (or a combination of servers).

The computer 702 can receive requests over network 730 from a client application (for example, executing on another computer 702) and responding to the received requests by processing the said requests in an appropriate software application. In addition, requests may also be sent to the computer 702 from internal users (for example, from a command console or by other appropriate access method), external or third parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment that are connected to the network 730 (whether illustrated or not). Generally, the interface 704 comprises logic encoded in software or hardware (or a combination of software and hardware) and operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702.

Generally, the processor 705 executes instructions and manipulates data to perform the operations of the computer 702 and any algorithms, methods, functions, processes, flows, and procedures as described in the instant disclosure.

The computer 702 also includes a memory 706 that holds data for the computer 702 or other components (or a combination of both) that can be connected to the network 730 (whether illustrated or not). For example, memory 706 can be a database storing data consistent with this disclosure. Although illustrated as a single memory 706 in FIG. 7, two or more memories may be used according to particular needs, desires, or particular implementations of the computer 702 and the described functionality. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality described in this disclosure. For example, application 707 can serve as one or more components, modules, applications, etc. Further, although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, a computer system that includes computer 702, with each computer 702 communicating over network 730. Further, the term "client," "user," and other appropriate terminology may be used interchangeably as appropriate without departing from the scope of this disclosure. Moreover, this disclosure contemplates that many users may use one computer 702, or that one user may use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A computer-implemented method executed by one or more processors, the method comprising:
receiving a current observation describing an interaction of a user with a data intelligence system;
identifying a current user interest from a plurality of user interests based on the current observation, wherein past observations of the user with the data intelligence system are clustered to form the user interests in a Markov model;
using the Markov model and based on the current user interest, determining a next user interest from the user interests;
extracting at least one past observation from the determined next user interest based on a selection criterion and a threshold, wherein the selection criterion is based on how closely the at least one past observation matches the current observation; and
sending a recommendation to the user based on the at least one past observation, wherein the recommendation includes a sequence of queries for the data intelligence system determined according to the at least one past observation and wherein the sequence of queries includes Online Analytical Processing (OLAP) explorations or Structured Query Language (SQL) sessions.

2. The method of claim 1, wherein the Markov model includes transition probabilities between the user interests, and wherein the next user interest is determined according the transition probabilities between the user interests.

3. The method of claim 1, wherein the recommendation includes a set of queries for the data intelligence system determined according to the at least one past observation.

4. The method of claim 1, wherein the identification of the current user interest includes computing an average similarity between the current observation and all the past observations in each of the user interests of the Markov model.

5. The method of claim 1, wherein the interaction of the user with a data intelligence system is a user query or a user click.

6. The method of claim 1, wherein the past observations are clustered into the user interests based on a supervised classification using a feature-based metric.

7. The method of claim 6, wherein the supervised classification assigns a weight to each of a plurality of features describing each of the past observations.

8. The method of claim 1, wherein the recommendation includes possible next moves in a data exploration on the data intelligence system determined according to the at least one past observation.

9. One or more non-transitory computer-readable storage media coupled to one or more processors and having instructions stored thereon which, when executed by the one or more processors, cause the one or more processors to perform operations comprising:
receiving a current observation describing an interaction of a user with a data intelligence system;
identifying a current user interest from a plurality of user interests based on the current observation, wherein past observations of the user with the data intelligence system are clustered to form the user interests in a Markov model;
using the Markov model and based on the current user interest, determining a next user interest from the user interests;
extracting at least one past observation from the determined next user interest based on a selection criterion and a threshold, wherein the selection criterion is based on how closely the at least one past observation matches the current observation; and
sending a recommendation to the user based on the at least one past observation, wherein the recommendation includes a sequence of queries for the data intelligence system determined according to the at least one past observation and wherein the sequence of queries includes Online Analytical Processing (OLAP) explorations or Structured Query Language (SQL) sessions.

10. The one or more non-transitory computer-readable storage media of claim 9, wherein the Markov model includes transition probabilities between the user interests, and wherein the next user interest is determined according the transition probabilities between the user interests.

11. A system, comprising:
one or more processors; and
a computer-readable storage device coupled to the one or more processors and having instructions stored thereon which, when executed by the one or more processors, cause the one or more processors to perform operations comprising:
receiving a current observation describing an interaction of a user with a data intelligence system;
identifying a current user interest from a plurality of user interests based on the current observation, wherein past observations of the user with the data intelligence system are clustered to form the user interests in a Markov model;
using the Markov model and based on the current user interest, determining a next user interest from the user interests;

extracting at least one past observation from the determined next user interest based on a selection criterion and a threshold, wherein the selection criterion is based on how closely the at least one past observation matches the current observation; and sending a recommendation to the user based on the at least one past observation, wherein the recommendation includes a sequence of queries for the data intelligence system determined according to the at least one past observation and wherein the sequence of queries includes Online Analytical Processing (OLAP) explorations or Structured Query Language (SQL) sessions.

12. The system of claim 11, wherein the recommendation includes a set of queries for the data intelligence system determined according to the at least one past observation.

13. The system of claim 11, wherein the identification of the current user interest includes computing an average similarity between the current observation and all the past observations in each of the user interests of the Markov model.

14. The system of claim 11, wherein the past observations are clustered into the user interests based on a supervised classification using a feature-based metric.

15. The system of claim 14, wherein the supervised classification assigns a weight to each of a plurality of features describing each of the past observations.

16. The system of claim 11, wherein the recommendation includes possible next moves in a data exploration on the data intelligence system determined according to the at least one past observation.

* * * * *